United States Patent
Shon (10) Patent No.: US 6,418,328 B1
(45) Date of Patent: Jul. 9, 2002

(54) VOICE DIALING METHOD FOR MOBILE TELEPHONE TERMINAL

(75) Inventor: Jung-Hak Shon, Kumi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/476,440

(22) Filed: Dec. 30, 1999

(30) Foreign Application Priority Data

Dec. 30, 1998 (KR) .............................. 98-60792

(51) Int. Cl.[7] .............................. H04B 1/38; H04M 1/00
(52) U.S. Cl. .................. 455/563; 455/566; 455/412; 379/88.03; 379/355.09; 704/252
(58) Field of Search .................. 455/563, 564, 455/565, 566, 550, 412, 413, 414, 418, 79, 419; 379/88.03, 88.01, 88.02, 355.09, 355.1; 704/252, 275, 270, 278, 245

(56) References Cited

U.S. PATENT DOCUMENTS

| 4,731,811 A | * | 3/1988 | Dubus ........................ 455/563 |
| 6,154,526 A | * | 11/2000 | Dahlke et al. .............. 455/563 |
| 6,163,596 A | * | 12/2000 | Gelfer et al. ............ 379/88.03 |
| 6,208,713 B1 | * | 3/2001 | Rahrer et al. ........... 379/88.02 |
| 6,260,012 B1 | * | 7/2001 | Park ........................ 379/88.03 |
| 6,272,361 B1 | * | 8/2001 | Courtis et al. .............. 455/563 |

* cited by examiner

*Primary Examiner*—Vivian Chin
*Assistant Examiner*—Eliseo Ramos-Feliciano
(74) *Attorney, Agent, or Firm*—Dilworth & Barrese, LLP (57) ABSTRACT

A voice dialing method in a mobile telephone terminal. Upon reception of the dialing utterance, it is determined whether there are one or more pre-registered dialing utterances similar to an input dialing utterance within a first similarity value. If there are more than one dialing utterances within the first similarity value, it is determined whether there is a pre-registered dialing utterance similar to the input dialing utterance within a second similarity value higher than the first similarity value. If there is no dialing utterance within the second similarity value, names represented by the dialing utterances within the first similarity value are displayed. If a user selects one of the displayed names, a registered telephone number corresponding to the selected name is dialed. If there exists one dialing utterance within the second similarity value, a registered telephone number corresponding to the dialing utterance within the second similarity value is dialed.

4 Claims, 7 Drawing Sheets

▶ 1. TOM'S
2. TIM'S

FIG. 3A

▶ 1. ANN
2. ANNE
3. ANNA

VOICE DIALING METHOD FOR MOBILE TELEPHONE TERMINAL

This application claims priority to an application entitled "Voice Dialing Method for Mobile Telephone Terminal" filed in the Korean Industrial Property Office on Dec. 30, 1998 and assigned Ser. No. 98-60792, the contents of which are hereby incorporated by reference.

BACKGROUND OF THE INVENTION

1. Field of the Invention

The present invention relates generally to a mobile telephone terminal, and in particular, to a voice dialing method.

2. Description of the Related Art

For voice dialing in a portable phone, which is one kind of mobile telephone terminal, a user registers in the portable telephone a spoken name for dialing (hereinafter, referred to as a dialing utterance), a telephone number corresponding to the dialing utterance, and a name in characters which represents the dialing utterance. When dialing, the user speaks the dialing utterance according to a dialing utterance input notification so that the portable phone automatically dials the corresponding telephone number by speech recognition.

The voice dialing can be performed only if the user remembers a preregistered dialing utterance correctly. When he forgets the dialing utterance, he may give up voice dialing or speak a dialing utterance similar to an intended dialing utterance. Upon reception of a similar dialing utterance, the portable phone determines whether the dialing utterance has been registered. If it has not been registered, the portable phone notifies the user to speak a dialing utterance again or that the dialing has not been registered.

There are many well-known speech recognition techniques for determining whether a spoken name corresponds with a registered dialing utterance. Such techniques generally rely on quantifying properties of the utterance and comparing the quantified values. If the compared values correspond to within a predetermined amount and/or meet other quantified evaluation criteria, it is concluded that the two words are the same. Such correspondence will be generally referred to as a "similarity value" below. One similarity value is referred to as being "higher" than another when it uses an evaluation criteria that is stricter for the chosen technique.

For example, if the user registers a dialing utterance of "Ann's", a corresponding telephone number, and a name in characters, forgets the dialing utterance, and then speaks a dialing utterance "Ann" for voice dialing, the portable phone notifies the user to speak the dialing utterance again or that the dialing utterance has not been registered because "Ann" is not a recognized dialing utterance. Therefore, voice dialing may be impossible unless the user remembers the correct dialing utterance.

In the case that a plurality of similar dialing utterances are registered in the portable phone, the portable phone cannot ensure accurate speech recognition. If very similar dialing utterances "Joan" and "Joanne" are registered, they often cannot be accurately discriminated by recognition of user voice, resulting in dialing a wrong number.

Therefore, a conventional voice dialing service requires the user to remember a correct dialing utterance and may dial a wrong number by misrecognizing a dialing utterance spoken by a user when a plurality of similar dialing utterances have been registered.

SUMMARY OF THE INVENTION

It is, therefore, an object of the present invention to provide a voice dialing method which can be used even if a user cannot remember an intended dialing utterance correctly.

It is another object of the present invention to provide a voice dialing method for a mobile telephone terminal, in which an intended telephone number is dialed despite registration of a plurality of similar dialing utterances.

To achieve the above objects, there is provided a voice dialing method in a mobile telephone terminal. Upon reception of the dialing utterance, it is determined whether there are one or more pre-registered dialing utterances similar to an input dialing utterance within a first similarity value. If there are more than one dialing utterances within the first similarity value, it is determined whether there is a pre-registered dialing utterance similar to the input dialing utterance within a second similarity value. If there is no dialing utterance within the second similarity value, names represented by the dialing utterances within the first similarity value are displayed. If a user selects one of the displayed names, a registered telephone number corresponding to the selected name is dialed. If there exists one dialing utterance within the second similarity value, a registered telephone number corresponding to the dialing utterance within the second similarity value is dialed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention with unnecessary detail.

Figure 1:
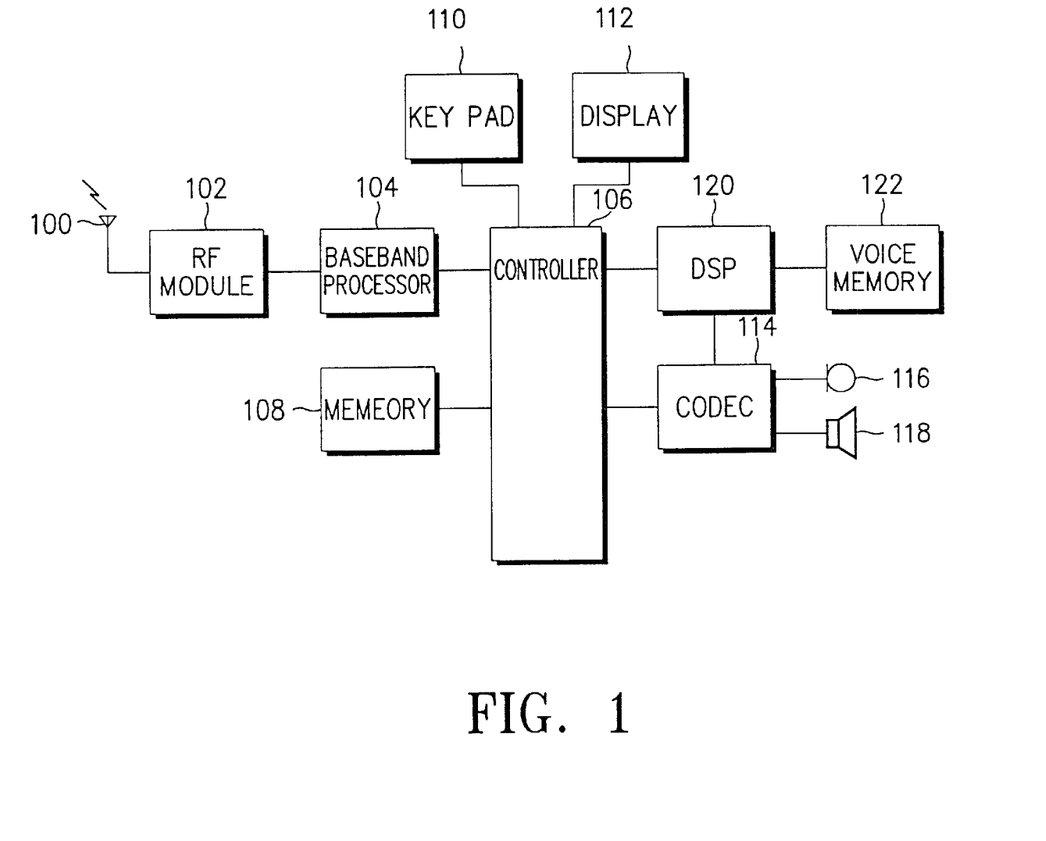
FIG. 1 is a schematic block diagram of a portable phone to which the present invention is applicable.

FIG. 1 is a schematic block diagram of a portable phone to which the present invention is applicable. Referring to FIG. 1, an RF (Radio Frequency) module 102 demodulates an RF signal received from a base station through an antenna 100 and modulates a signal received from a baseband processor 104 to an RF signal for transmission to a base station through the antenna 100. The baseband processor 104 downconverts the frequency of the demodulated signal received from the RF module 102 and converts a downconverted signal to a digital signal. The baseband processor 104 also converts a signal received from a controller 106 to an analog signal and upconverts the frequency of the analog signal prior to transmission to the RF module 102.

The controller 106 provides an overall control to the portable phone of FIG. 1. If the portable phone operates in a CDMA scheme, an MSM (Mobile System Modem) chip of Qualcomm, for example, can be used as the controller 106. The controller 106 recovers an audio signal from the digital signal received from the baseband processor 104 and applies the audio signal as audio data to a CODEC (Coder-Decoder) 114, or compresses audio data received from the CODEC 114 and applies the compressed data to the baseband processor 104.

For voice dialing, the controller 106 controls the CODEC 114 to transmit audio data to a DSP (Digital Signal Processor) 120 and store the audio data in a voice memory 122, and compares the audio data stored in the voice memory 122 with audio data received from the CODEC 114, for voice dialing. Under the control of the controller 106, the CODEC 114 decodes the audio data received from the controller 106 or the DSP 120 to an audio signal and outputs the audio signal through a speaker 118, or encodes an audio signal received through a microphone 116 to audio data and transmits the audio data to the controller 106 or the DSP 120.

The DSP 120 digitally processes the audio data received from the CODEC 114 into compressed audio data and stores the compressed audio data in the voice memory 122, or reads compressed audio data from the voice memory 122, digitally processes the read audio data, and transmits the processed data to the CODEC 114. The voice memory 122 stores dialing utterances, an utterance indicating that a dialing utterance is selected (hereinafter, referred to as selection utterance), an utterance of a reference number corresponding to a dialing utterance (hereinafter, referred to as number utterance), and other audio data of notification messages according to the preferred embodiments of the present invention.

A memory 108 includes a flash memory for storing a process program of the controller 106, a static RAM for storing flag information and call processing information, and an EEPROM (Electrically Erasable and Programmable ROM) for storing set-up information like power levels. The static RAM stores a telephone number and a name registered corresponding to a dialing utterance stored in the voice memory 122 for voice dialing. A key pad 110 has a plurality of keys for entering various commands and dialing and provides information corresponding to a key input to the controller 106. A display 112 is an LCD (Liquid Crystal Display) module, for displaying information received from the controller 106.

Figure 2:
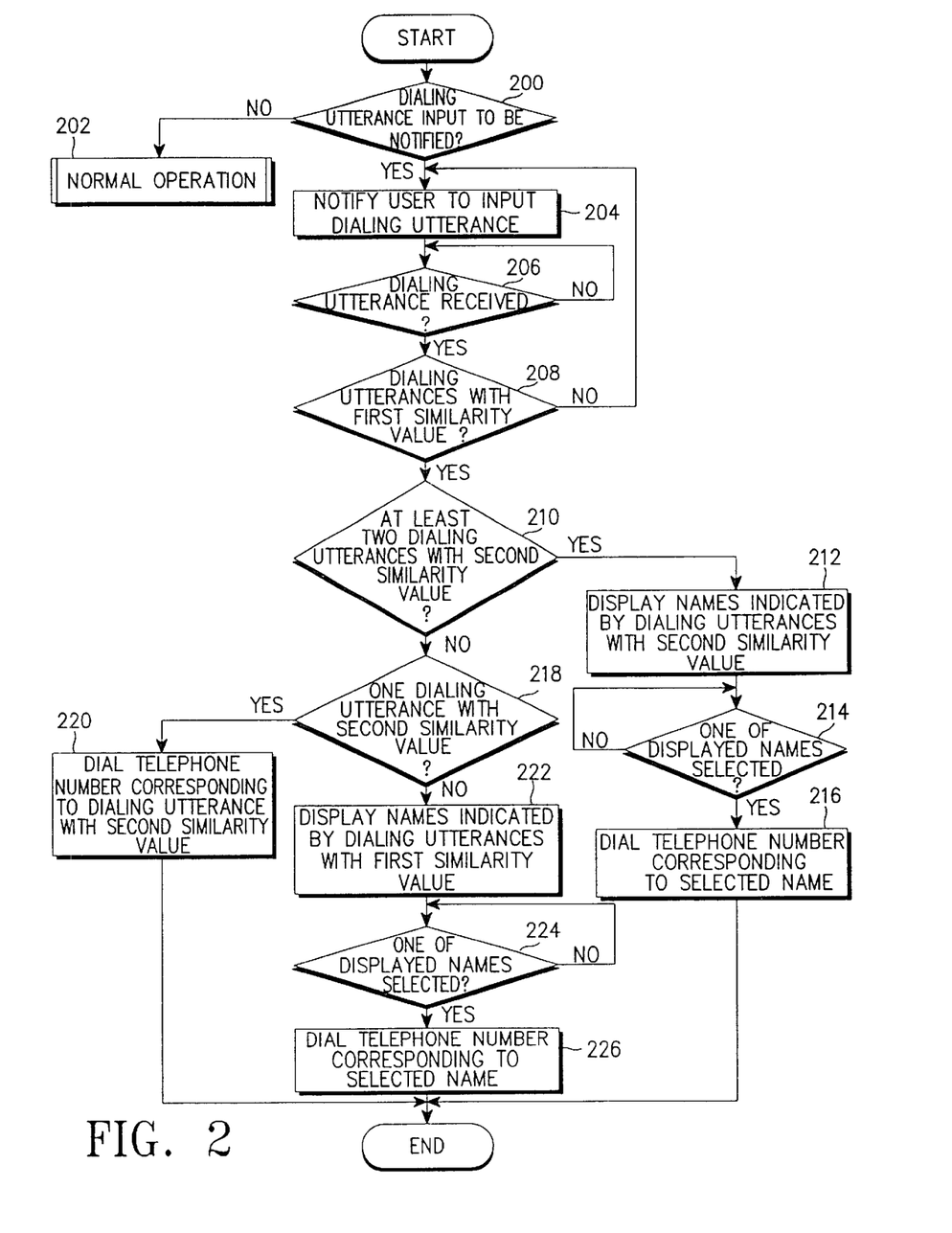
FIG. 2 is a flowchart depicting a voice dialing method according to a first preferred embodiment of the present invention.

With reference to FIG. 2, there will be given a description of a voice dialing method according to a first preferred embodiment of the present invention. In step 200, the controller 106 determines whether to notify a user to speak a dialing utterance upon user opening the flip of the portable phone in a voice dialing mode. The controller 106 can recognize the opening of the flip by a flip opening sensor.

When the controller 106 determines that the notification is to be issued, the controller 106 goes to step 204 and, otherwise, it goes to step 202 to perform a normal operation. The controller 106 controls the DSP 120 to read a message retrieved from the voice memory 122 requesting the user input a dialing utterance. The request is output to the speaker 118 through the CODEC 114 in step 204. Controller 106 determines whether the user has spoken a dialing utterance through the microphone 116 in step 206. Upon reception of the dialing utterance, the controller 106 determines whether there are dialing utterances registered in the voice memory 122 that fall within a first similarity value with respect to the input dialing utterance, as in step 208. Here, the first similarity value can be 50%. That is, the controller 106 determines whether there are registered dialing utterances roughly similar to the spoken dialing utterance in step 208. If there are stored dialing utterances similar to the spoken dialing utterance as measured by the first similarity value, the controller 106 goes to step 210, and otherwise, it returns to step 204.

In step 210, the controller 106 determines whether there are at least two registered dialing utterances similar to the spoken dialing utterance or measured by a second similarity value. Here, the second similarity can be 90%. That is, the controller 106 determines whether there are at least two registered dialing utterances very similar to the spoken dialing utterance in step 210. If the number of registered dialing utterances with the second similarity value is at least two, the controller 106 considers that accurate speech recognition cannot be ensured and goes to step 212.

In step 212, the controller 106 displays the dialing utterances having the second similarity value on the display 112 so that the user can select an intended dialing utterance through the key pad 110. In step 214, the controller 106 determines whether the user has selected one of the displayed dialing utterances. Upon user selection of a dialing utterance, the controller reads a telephone number corresponding to the selected dialing utterance from the memory 108 and dials the number in step 216. If a dialing utterance is not selected in step 214, the controller 106 waits a predetermined amount of time for a selection by the user. If there is no selection after a predetermined amount of time, the voice dialing operation is terminated.

If the number of dialing utterances with the second similarity value is smaller then two in step 208, the controller 106 determines whether the number of dialing utterances with the second similarity value is one in step 218. If the number is one, the controller 106 determines that the input dialing utterance matches the dialing utterance with the second similarity and then dials a telephone number corresponding to the dialing utterance with the second similarity value in step 220.

If there is no dialing utterance with the second similarity value in step 208, the controller 106 considers that the user remembers a wrong dialing utterance. Then, the controller 106 reads the registered dialing utterances with the first similarity value from the memory 108 and displays them on the display 112 in step 222, so that the user can select one of them through the key pad 110. The controller 106 determines whether the user has selected one of them in step 224. Upon user selection of one of the displayed dialing utterances, the controller 106 dials a telephone number corresponding to the selected dialing utterance in step 226. If one of the displayed names is not selected in step 224, the controller 106 waits a predetermined amount of time for a selection by the user. If there is no selection after a predetermined amount of time, the voice dialing operation is terminated.

An example of the voice dialing method according to the first preferred embodiment of the present invention will now be described. A user registers dialing utterances, corresponding telephone numbers, and names in characters for "Ann", "Annie", "Anna", "Tom's", "Tim's", "office", . . . in the memory 108.

Figure 3A:
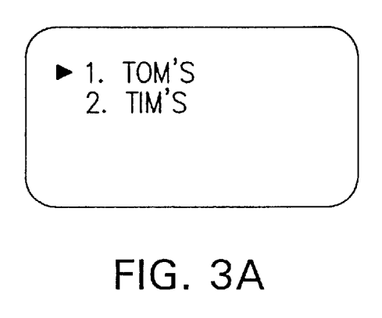
FIGS. 3A and 3B illustrates examples of registered names corresponding to a dialing utterance.

When the user sets a voice dialing mode and opens the flip of the portable phone, the controller 106 notifies the user to enter a dialing utterance. If the user enters "Tom" instead of a correct dialing utterance "Tom's", the controller 106 displays "Tom's" and "Tim's" roughly similar to "Tom" on the display 112, as shown in FIG. 3A. Upon user selection of "Tom's", the controller 106 dials a registered telephone number corresponding to "Tom's". Therefore, even if the user cannot remember an intended pre-registered dialing utterance correctly, a corresponding telephone number can be dialed.

Figure 3B:
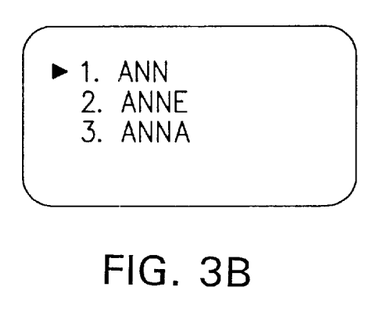

When the user enters a dialing utterance "Ann", for example, the controller 106 determines that accurate speech recognition cannot ensured because there are "Anne" and "Anna" very similar to "Ann". Then, the controller 106 displays "Ann", "Anne", and "Anna" on the display 112 as shown in FIG. 3B. Upon user selection of "Ann", the controller 106 dials a registered telephone number corresponding to "Ann". Hence, the user can dial an intended telephone number despite registration of a plurality of very similar dialing utterances.

A voice dialing method according to a second preferred embodiment of the present invention will now be described. In the second embodiment, roughly or very similar registered dialing utterances displayed on the display 112 are announced and the user can select one of the dialing utterances by voice.

Figure 4:
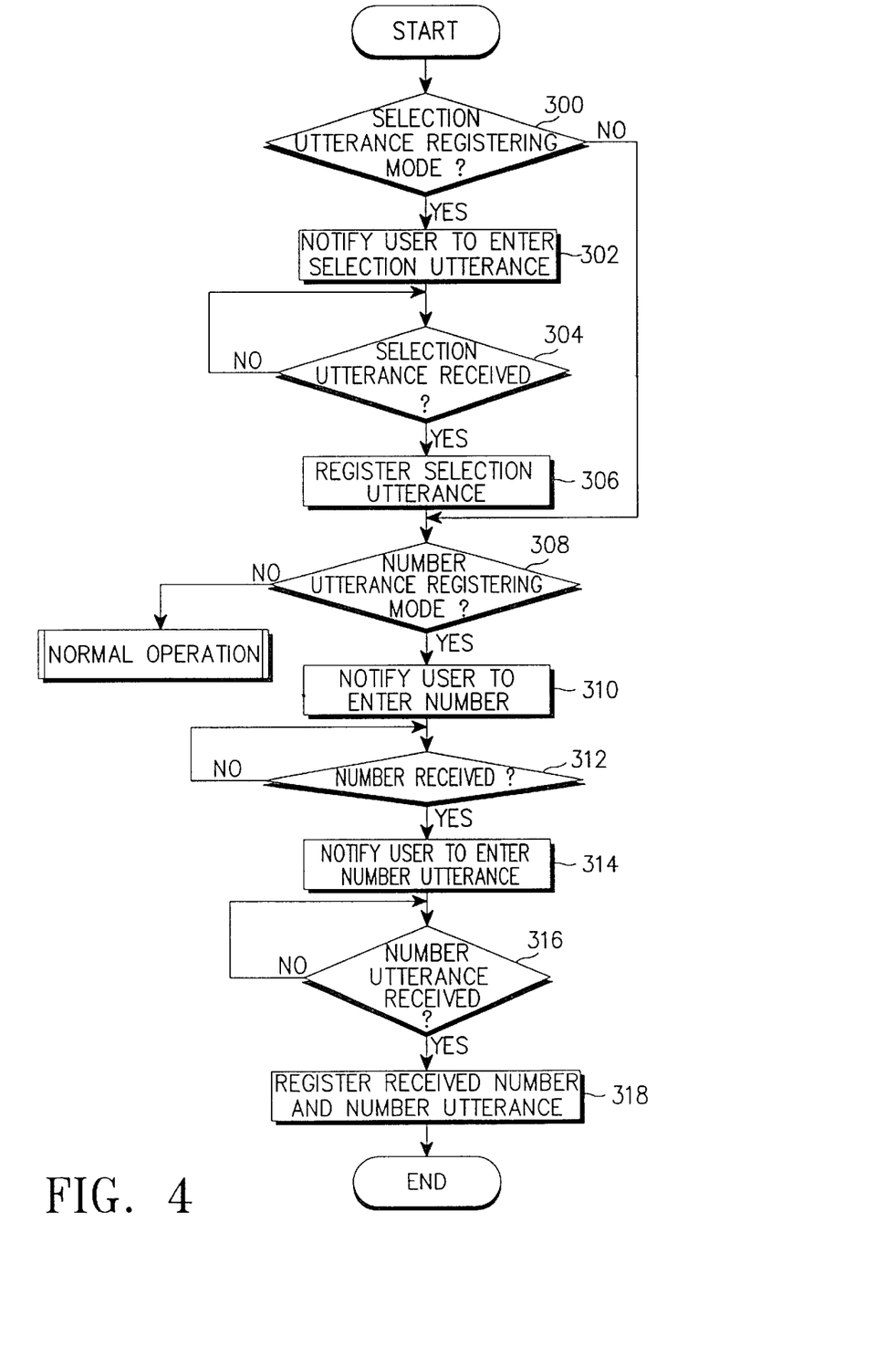
FIG. 4 is a flowchart depicting a selection utterance and number utterance registering method according to a second preferred embodiment of the present invention.

The second embodiment includes the registering of dialing utterances and corresponding telephone numbers, as described above. In addition, the user registers a selection utterance for selecting a registered dialing utterance and a number utterance for entering a reference number corresponding to each dialing utterance, which may be used to select the dialing utterance. FIG. 4 is a flowchart depicting a method of registering a selection utterance and a number utterance according to the second preferred embodiment of the present invention. Referring to FIG. 4, the controller 106 determines whether a command requesting entry of a selection utterance registering mode has been received through the key pad 110, as represented in step 300. If so, the controller 106 notifies the user to enter a selection utterance in step 302. A message notifying the user to enter a selection utterance can be displayed on the display 112. In step 304, the controller 106 determines whether the user has entered the selection utterance. Upon reception of the selection utterance, the controller 106 registers the input selection utterance in step 306. That is, the controller 106 stores the input selection utterance in the voice memory 122 through the CODEC 114 and the DSP 120. For example, the selection utterance can be "OK".

The controller 106 then determines whether the user has requested entry of a number utterance registering mode through the key pad 110, as represented in step 308. Upon reception of the command the controller 106 notifies the user to enter a number to be registered, as in step 310. A message notifying the user to enter a number to be registered can be displayed on the display 112. In step 312, the controller 106 determines whether the user has entered a number, for example, via the keypad 110, in response to the notification message.

Upon reception of the number, the controller 106 notifies the user to speak the input number in step 314. To do so, a message notifying the user to speak the input number can be displayed on the display 112. In step 316, the controller 106 determines whether the user has uttered the input number. Upon reception of the number utterance, the controller 106 registers the input number and the number utterance in step 318. That is, the controller 106 stores the number input via keypad 110 in the memory 108 and the number utterance in the voice memory 122 through the CODEC 114 and the DSP 120. In general, a sequence of number utterances, such as 1–10, are stored in the manner in memory, in order to allow the number utterances to be used to select amongst a number of dialing utterances as described further below.

Figure 5A:
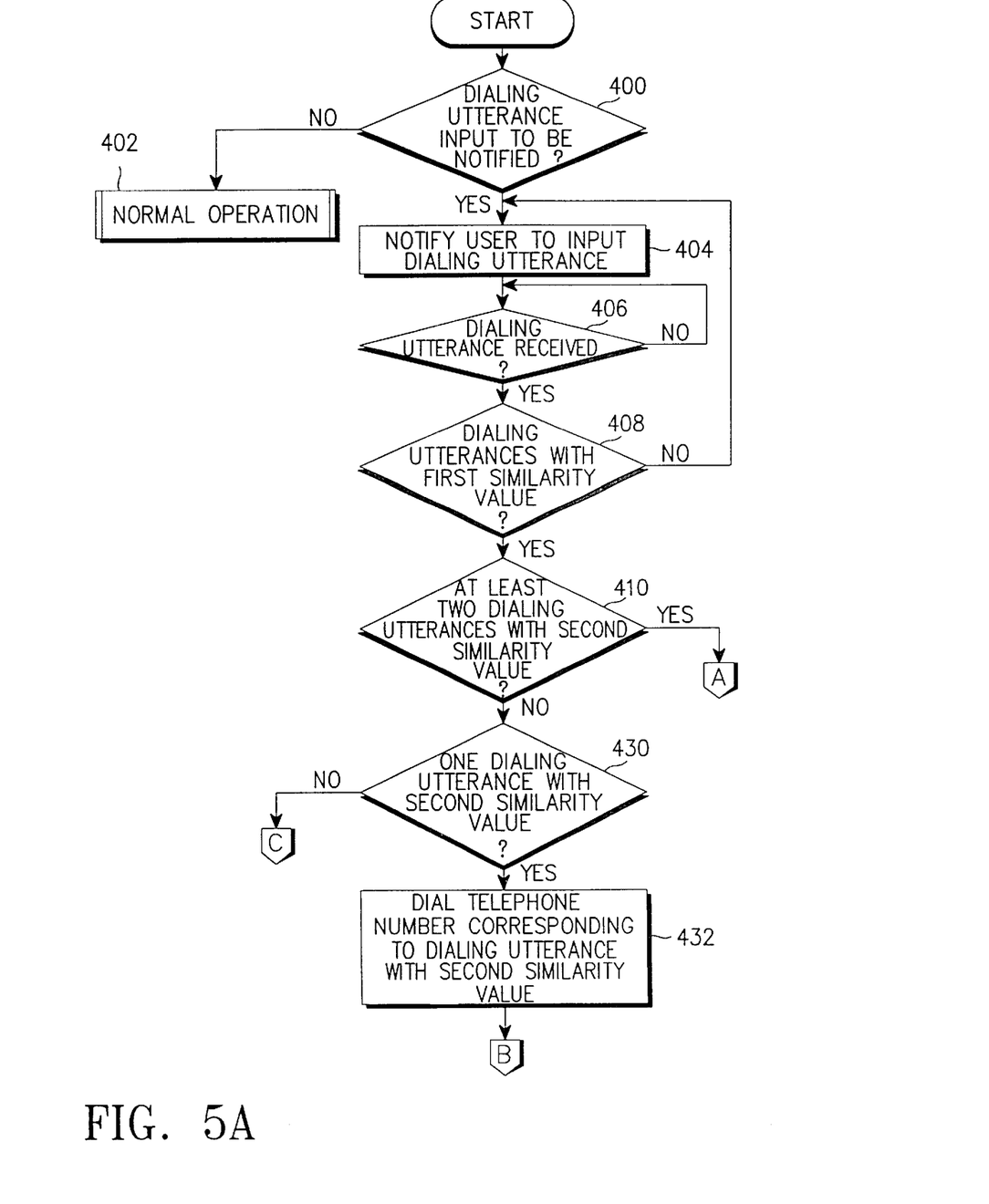
FIGS. 5A, 5B, and 5C are a flowchart depicting a voice dialing method according to the second preferred embodiment of the present invention.

After the selection utterance and the number utterance are registered, a voice dialing method of the second embodiment can be performed. This will be described referring to FIGS. 5A, 5B, and 5C. Steps 400 to 410 in FIG. 5A are the same as steps 200 to 210 in FIG. 2, and their description will be omitted.

If there are at least two registered dialing utterances with the second similarity value in step 410, the controller 106 considers that accurate speech recognition cannot be ensured. Then, the controller 106 numbers the names representing the dialing utterances and displays the numbered names on the display 112 in step 412. In step 414, the controller 106 outputs an announcement message for a first displayed name, using the number and dialing utterance corresponding to the name. For example, the announcement message stored in the voice memory can be "A first similar utterance of the input utterance is XX. Shall XX be dialed?". The controller 106 reads the dialing utterance corresponding to the first displayed name from the voice memory 122 and outputs it through the DSP 120 and the CODEC 114. When the user wants to dial the telephone number for the dialing utterance in the announcement message, he speaks the pre-registered selection utterance in response to the announcement.

In step 416, the controller 106 determines whether the user has spoken the pre-registered selection utterance through the microphone 116. Upon reception of the selection utterance, the controller 106 dials the registered telephone number corresponding to the selected dialing utterance in step 428.

If the user has not spoken the selection utterance, the controller 106 determines whether a predetermined time has elapsed in step 418. After the predetermined time, the controller 106 goes to step 420. If the predetermined time has not passed, the controller 106 goes back to step 416 until the selection utterance is received or the predetermined time elapses.

Figure 5B:
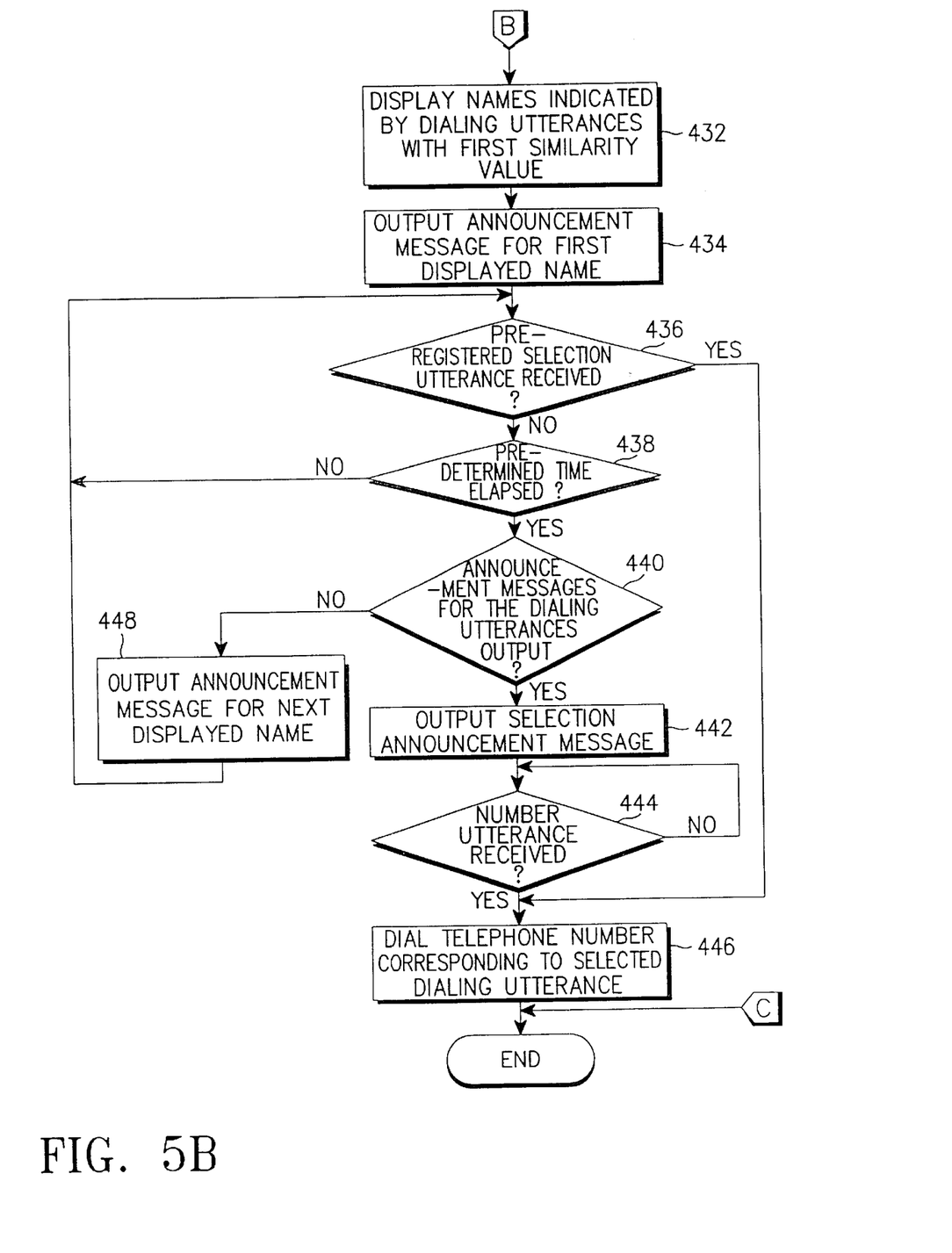

In step 420, the controller 106 determines whether announcement messages have been output for all the displayed names. If all the announcement messages have been output, the controller 106 goes to step 424. If not, it goes to step 422. In step 422, the controller 106 outputs an announcement message for a second displayed name and goes to step 416. Steps 416 and 418 are repeated for this announcement-message, as described above.

Assuming none of the announcement messages are selected, in step 424, the controller 106 outputs an announcement message notifying the user to select one of the announced dialing utterances. The announcement message can be "Speak the number of the name desired". As noted above, the display 112 displays a numbered list of the names representing the dialing utterances. Using the stored number utterances, the controller 106 determines whether the user has spoken the number corresponding to one of the dialing utterances in the list (step 426). Thus, if the controller 106 determines that a spoken number is the same number as a stored number utterance or very similar to a stored number utterance, it concludes that the received spoken dialing number matches the number utterance. In step 428, the controller 106 dials the telephone number corresponding to the displayed name with the selected number.

If the number of dialing utterances with the second similarity value is smaller than two in step 410, the controller 106 determines that whether there is one dialing utterance with the second similarity value in step 430. If the number of the dialing utterances with the second similarity value is one, the controller 106 determines that the input dialing utterance matches the registered dialing utterance and dials a registered telephone number corresponding to the registered dialing utterance in step 450.

Figure 5C:
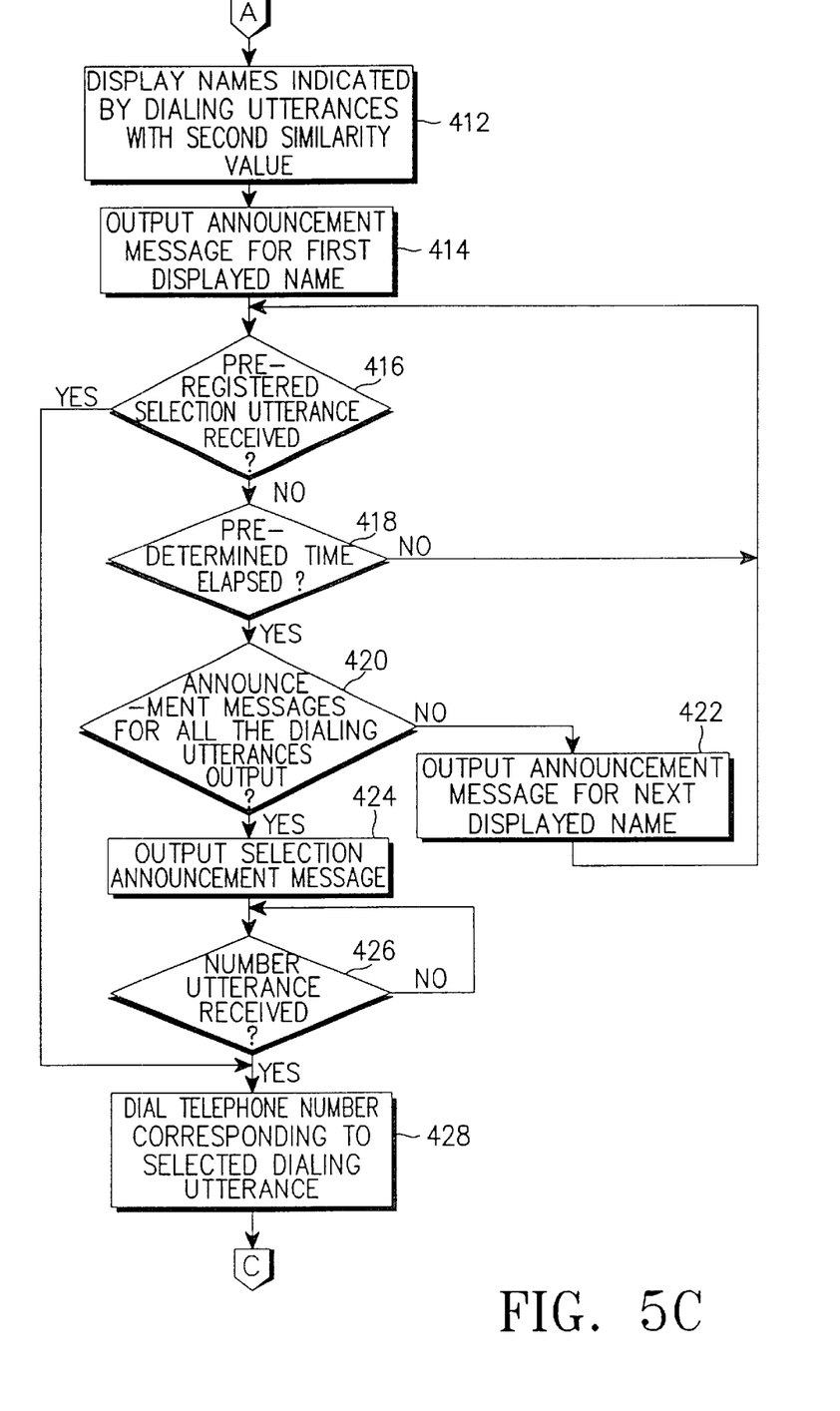

If there is no dialing utterance with the second similarity value in step 430, the controller 106 considers that the user remembers a wrong dialing utterance and displays the names corresponding to the dialing utterances with the first similarity value, that is, the stored dialing utterances roughly similar to the input dialing utterance. The controller 106 numbers the names representing the dialing utterances and displays the numbered names on the display 112 in step 432. In step 434, the controller 106 outputs an announcement message for a first displayed name, using the number and dialing utterance of the name. The user speaks the selection utterance if he intends to dial a telephone number corresponding to the announced dialing utterance and does not speak the selection utterance if he does not want to.

In step 436, the controller 106 determines whether the user has spoken the pre-registered selection utterance through the microphone 116. Upon reception of the selection utterance, the controller 106 dials the registered telephone number corresponding to the selected dialing utterance in step 438.

If the selection utterance has not been received, the controller 106 determines whether a predetermined time has elapsed in step 438. After the predetermined time, the controller 106 goes to step 440. If the predetermined time was not passed, the controller 106 returns to step 436 to await reception of the selection utterance. In step 440, the controller 106 determines whether announcement messages have been output for all the displayed names. If so, the controller 106 goes to step 442. If not, it outputs an announcement message for a subsequent displayed name and goes to step 436. Steps 436–448 are repeated until an announcement is selected or no more names remain on the list.

Assuming none of the announcement messages are selected, the controller 106 outputs an announcement message notifying the user to select one of the dialing utterances announced so far, in step 442. The user may select one of the numbers corresponding to one of the dialing utterances by speaking it. In step 444, the controller 106 determines whether the number of a selected dialing utterance has been spoken by comparing the spoken number with stored number utterances. Upon reception of the number utterance, the controller 106 dials a registered telephone number corresponding to the dialing utterance numbered with the number spoken in step 446.

In accordance with the second embodiment of the present invention, if a user speaks an incorrect dialing utterance, roughly similar dialing utterances are detected and notified in announcement messages so that the user can select an intended dialing utterance. Therefore, the user can select a desired dialing utterance according to an announcement message in the portable phone, without manipulating the key pad 110.

As described above, the present invention has the advantage that despite input of a dialing utterance similar to an intended dialing utterance, a telephone number corresponding to the intended dialing utterance is dialed. Another advantage is that a telephone number that the user intends to dial is dialed even if a plurality of similar dialing utterances are registered in a portable phone.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A voice dialing method in a mobile telephone terminal, comprising the steps of:

upon reception of a dialing utterance, determining whether there are dialing utterances pre-registered in a memory of said mobile telephone terminal similar to the input dialing utterance within a first similarity value among pre-registered dialing utterances;

if there are dialing utterances within the first similarity value, determining whether there is a dialing utterance similar to the input dialing utterance within a second similarity value higher than the first similarity value among the pre-registered dialing utterances;

if there is no dialing utterance within the second similarity value, displaying names represented by the dialing utterances within the first similarity value, and dialing a registered telephone number corresponding to a displayed name if a user selects the displayed name; and if there is a dialing utterance within the second similarity value, dialing a registered telephone number corresponding to the dialing utterance within the second similarity value.

2. A voice dialing method in a mobile telephone terminal, comprising the steps of:

upon reception of a dialing utterance, determining whether there are dialing utterances among pre-registered dialing utterances similar to the input dialing utterance within a first similarity value;

if there are dialing utterances within the first similarity value, determining whether there are at least two dialing utterances among the pre-registered dialing utterances similar to the input dialing utterance within a second similarity value higher than the first similarity value;

if there are at least two dialing utterances within the second similarity value, displaying names represented by the at least two dialing utterances within the second similarity value and dialing a registered telephone number corresponding to a displayed name if a user selects the displayed name;

if the dialing utterance is the only dialing utterance within the second similarity value, dialing a registered telephone number corresponding to the dialing utterance within the second similarity value; and if there is no dialing utterance within the second similarity value, displaying names represented by the dialing utterances within the first similarity value and dialing a registered telephone number corresponding to a displayed name within the first similarity value if the user selects the displayed name.

3. A voice dialing method in a mobile telephone terminal, comprising the steps of:

upon reception of a dialing utterance, determining whether there are dialing utterances among pre-registered dialing utterances similar to an input dialing utterance within a first similarity value;

if there are dialing utterances within the first similarity value, determining whether there are at least two dialing utterances among the pre-registered dialing utterances similar to the input dialing utterance within a second similarity value higher than the first similarity value;

if there are at least two dialing utterances within the second similarity value, announcing names represented by the at least two dialing utterances within the second similarity value and dialing a registered telephone number corresponding to an announced name if a user selects the announced name;

if the dialing utterance is the only dialing utterance within the second similarity value, dialing a registered telephone number corresponding to the dialing utterance within the second similarity value; and if there is no dialing utterance within the second similarity value, announcing names represented by the dialing utterances within the first similarity value and dialing a registered telephone number corresponding to an announced name if a user selects the announced name.

4. A voice dialing method in a mobile telephone terminal, comprising the steps of:

upon reception of a dialing utterance, determining whether there are dialing utterances among pre-registered dialing utterances similar to an input dialing utterance within a first similarity value;

if there are dialing utterances within the first similarity value, determining whether there are at least two dialing utterances among the pre-registered dialing utterances similar to the input dialing utterance within a second similarity value higher than the first similarity value;

if there are at least two dialing utterances within the second similarity value, numbering the at least two dialing utterances within the second similarity value and announcing the numbered dialing utterances with the numbers in predetermined time intervals; dialing a registered telephone number corresponding to the previously announced dialing utterance within the second similarity value upon user input of a selection utterance in the period between announcements; and, if no selection utterance is input after the dialing utterances within the second similarity value are completely announced, dialing a registered telephone number corresponding to a dialing utterance within the second similarity value upon user utterance of a number corresponding to the dialing utterance within the second similarity value;

if the dialing utterance is the only dialing utterance within the second similarity value, dialing a registered telephone number corresponding to the dialing utterance within the second similarity value; and if there are no dialing utterances within the second similarity value, numbering the dialing utterances within the first similarity value and announcing the numbered dialing utterances with the numbers in predetermined time intervals; dialing a registered telephone number corresponding to the previously announced dialing utterance within the first similarity value upon user input of a selection utterance in the period between announcements; and, if no selection utterance is input, dialing a registered telephone number corresponding to a dialing utterance within the first similarity value upon user utterance of a number corresponding to the dialing utterance within the first similarity value after the dialing utterances within the first similarity value are completely announced.

* * * * *